US008185340B2

(12) United States Patent
Watanabe et al.

(10) Patent No.: US 8,185,340 B2
(45) Date of Patent: May 22, 2012

(54) ANALYSIS APPARATUS AND ANALYSIS METHOD

(75) Inventors: Tomohiro Watanabe, Kunisaki (JP); Kenji Taki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 421 days.

(21) Appl. No.: 12/420,581

(22) Filed: Apr. 8, 2009

(65) Prior Publication Data

US 2009/0252511 A1 Oct. 8, 2009

(30) Foreign Application Priority Data

Apr. 8, 2008 (JP) ................................ 2008-100754

(51) Int. Cl.
*G06F 15/00* (2006.01)

(52) U.S. Cl. .......................... 702/127; 73/64.56; 702/81

(58) Field of Classification Search .................... 702/41, 702/81, 85, 127, 141; 73/64.56; 382/239; 399/45

See application file for complete search history.

(56) References Cited

U.S. PATENT DOCUMENTS 6,236,756 B1 * 5/2001 Kimura et al. ................ 382/239
7,047,795 B2 * 5/2006 Sato ............................. 73/64.56
7,899,634 B1 * 3/2011 McIntyre et al. ............... 702/81

FOREIGN PATENT DOCUMENTS

JP 9-91316 A 4/1997

* cited by examiner

*Primary Examiner* — John H Le

(74) *Attorney, Agent, or Firm* — Canon USA Inc. IP Division

(57) ABSTRACT

A recording-medium-type setting unit selects a type of a recording medium to be analyzed on the basis of information input with an input unit. A threshold-value setting unit sets a threshold value on which the determination of whether the calculation result is output in a file is based for each recording medium type selected by the recording-medium-type setting unit. An amount-of-variation calculating unit calculates the reaction force for every time step, stores the reaction force in the current time step in time integration in a RAM during the calculation, and monitors the amount of variation in the reaction force between each time step and the next time step. A file-output controlling unit calculates the difference between the reaction force stored by the amount-of-variation calculating unit and the reaction force in the current time step and, if the difference is larger than the threshold value, performs file output.

6 Claims, 11 Drawing Sheets

ANALYSIS APPARATUS AND ANALYSIS METHOD

BACKGROUND OF THE INVENTION

1. Field of the Invention

The present invention relates to an analysis apparatus and an analysis method, more specifically, design of a conveying path of a sheet recording medium.

2. Description of the Related Art

In design of the object, it is preferable to examine the functions of an object under various conditions before manufacturing the object or a prototype of the object because the examination allows the number of processes necessary to manufacture and test the prototype of the object to be decreased and also allows the development time and the cost to be reduced. This applies to the design of the conveying path of a sheet recording medium, such as a sheet of paper or a film, in an image forming apparatus, such as a copier or a laser-beam printer (LBP).

Accordingly, the behaviors of sheet recording media that are being conveyed are analyzed by simulation. For example, technologies for simulating the behaviors of recording media includes a technology disclosed in Katsuhito Sudoh, 2000, “Modeling a String from Observing the Real Object”, Proc. of Int. Conf. on Virtual Systems and Multimedia (VSMM 2000), pp. 544-553, in which a recording medium is simply represented by the mass and spring. A solution to the motion of a recording medium is sought by numerical time integration, in which the equation of motion of the recording medium discretely represented by a mass-spring system is formulated, the target analysis time is divided into time steps each having a finite width, and the unknown acceleration, velocity, and displacement are sequentially calculated for every time step from time 0. For example, Newmark’s β method, Wilson’s θ method, Euler method, and Kutta-Merson method are widely used for such simulation.

In the simulation of a recording medium that is being conveyed, the calculation result is output to quantitatively evaluate a phenomenon, such as a collision, of the recording medium. The phenomenon such as a collision of the recording medium, which occurs in a very short period of time, has a waveform having a momentary peak. Information in short time steps is necessary to evaluate such a waveform.

Output of all the data for every time step about the calculation result of the recording medium results in the file of a great size. Consequently, the load of readout of the resulting file is produced and, furthermore, it takes time to display the waveform on a screen. In order to resolve the above problems, the file is generally output for every several time steps to decrease the file size.

In order to resolve the problem that the display of the result of the file output of a great size on an screen increases the load, for example, a method of displaying only characteristic parts in detail and roughly displaying the remaining parts is disclosed in Japanese Patent Laid-Open No. 9-91316.

However, when the file is output for every several time steps, there is a problem in that information calculated between a certain file output and the next file output is not output in the file despite the fact that it is desirable to record the information.

In addition, the amount of information about the parts that are necessary for the evaluation is varied depending on the rigidity of the recording medium. For example, it is assumed that a recording medium having a higher rigidity and a recording medium having a lower rigidity are provided. In this case, as the rigidity is increased, the reaction force of the recording medium in a collision has a waveform having higher and sharper peaks and, therefore, it is necessary to output the file in shorter time steps in order to pick up the characteristics of the waveform. Conversely, as the rigidity is decreased, the reaction force has a waveform having lower and wider peaks and, therefore, the file is output in time steps longer than those of the recording medium having a higher rigidity. Under such conditions, the file output in the same conditions across different types of the recording media results in appropriate file output for some types of the recording media but fails in detailed file output for some types of the recording media. In addition, the waveforms that are too fine are undesirably output for some types of the recording media.

SUMMARY OF THE INVENTION

An embodiment of the present invention provides an analysis apparatus and an analysis method capable of analyzing a conveying path in detail while suppressing an increase in size of the file in file output.

According to an exemplary embodiment of the present invention, an analysis apparatus includes a threshold-value setting unit configured to set a type of a recording medium to be analyzed and a threshold value; a calculating unit configured to calculate a physical quantity concerning the recording medium when the recording medium is being conveyed in a conveying path that is designed and to store the calculated physical quantity in a storage unit; and an output unit configured to output the physical quantity on a cycle shorter than that in a case where an amount of variation in the physical quantity calculated by the calculating unit exceeds the threshold value, if the amount of variation in the physical quantity is less than the threshold value.

According to another exemplary embodiment of the present invention, an analysis method includes the steps of setting a type of a recording medium to be analyzed and a threshold value; calculating a physical quantity concerning the recording medium when the recording medium is being conveyed in a conveying path that is designed and storing the calculated physical quantity in a storage unit; and outputting the physical quantity on a cycle shorter than that in a case where an amount of variation in the calculated physical quantity exceeds the threshold value, if the amount of variation in the physical quantity is less than the threshold value.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DESCRIPTION OF THE EMBODIMENTS

Exemplary embodiments of the present invention will herein be described in detail with reference to the attached drawings.

Figure 1:
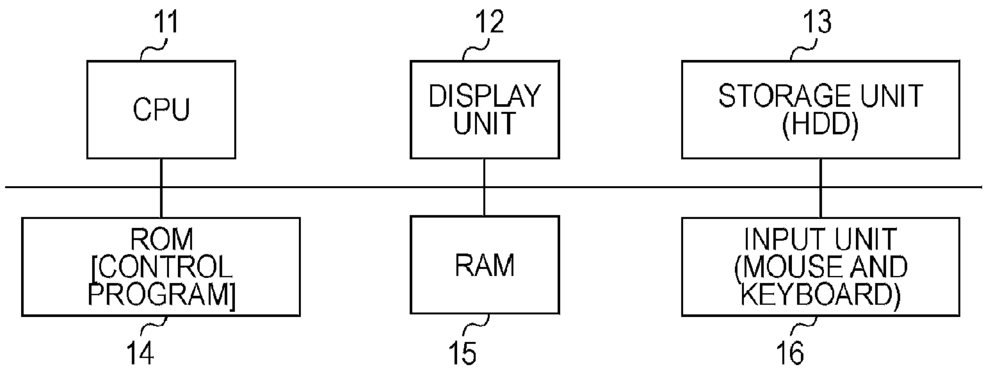
FIG. 1 is a block diagram showing an example of the configuration of a design support apparatus according to an exemplary embodiment of the present invention.

FIG. 1 is a block diagram showing an example of the configuration of a design support apparatus (analysis apparatus) according to an exemplary embodiment of the present invention.

Referring to FIG. 1, the design support apparatus includes a central processing unit (CPU) 11, a display unit 12, a storage unit 13, a read only memory (ROM) 14, a random access memory (RAM) 15, and an input unit 16. The ROM 14 stores control programs, various application programs, and data. The CPU 11 uses the above programs and data to control the entire design support apparatus. The various application programs include a design support program. The RAM 15 is used as a working area, for example, when the CPU 11 performs processing while controlling each unit by using the control programs and the application programs. For example, a hard disk is used as the storage unit 13 that stores the result of analysis by the CPU 11, etc. when the CPU 11 performs the processing. For example, a keyboard and a mouse are used as the input unit 16 that receives a user's input. The display unit 12 displays, for example, information input by the user with the input unit 16 and the result of the analysis in response to instructions from the CPU 11 based on the control programs or the various application programs.

Figure 2:
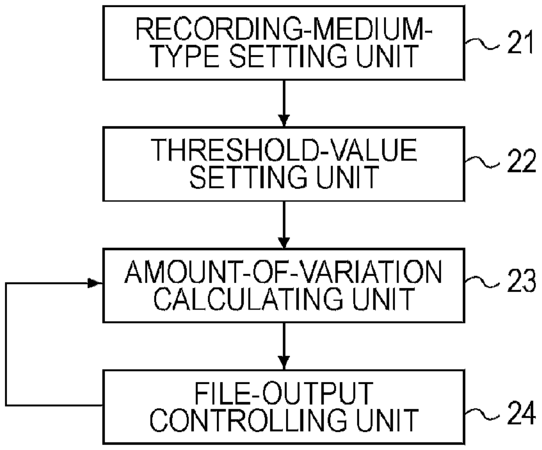
FIG. 2 is a functional block diagram showing an example of a block configuration realized by a CPU that executes a design support program.

The content of the design support program will now be roughly described. FIG. 2 is a functional block diagram showing an example of a block configuration realized by the CPU 11 that executes the design support program.

The block configuration includes a recording-medium-type (the type of a recording medium) setting unit 21, a threshold-value setting unit 22, an amount-of-variation calculating unit 23, and a file-output controlling unit 24.

The recording-medium-type setting unit 21 selects a recording medium type to be analyzed on the basis of information input with the input unit 16. The threshold-value setting unit 22 sets a threshold value on which the determination of whether the calculation result is output in a file is based for each recording medium type selected by the recording-medium-type setting unit 21. The setting of the threshold value may be based on the default settings or may be based on information input with the input unit 16, as described below.

The amount-of-variation calculating unit 23 calculates the reaction force for every time step, stores the reaction force in the current time step in time integration in the storage unit 13 or the RAM 15 during the calculation, and monitors the amount of variation in the reaction force between each time step and the next time step. The file-output controlling unit 24 calculates the difference between the reaction force stored by the amount-of-variation calculating unit 23 and the reaction force in the current time step (the amount of variation in the reaction force between continuous time steps) and, if the difference is larger than the threshold value set by the threshold-value setting unit 22, performs file output.

Although not shown in FIG. 2, the block configuration also includes a display controlling unit that displays a screen of a predetermined configuration in the display unit 12 and that reflects the content of an instruction input with the input unit 16 on the screen.

Figure 3:
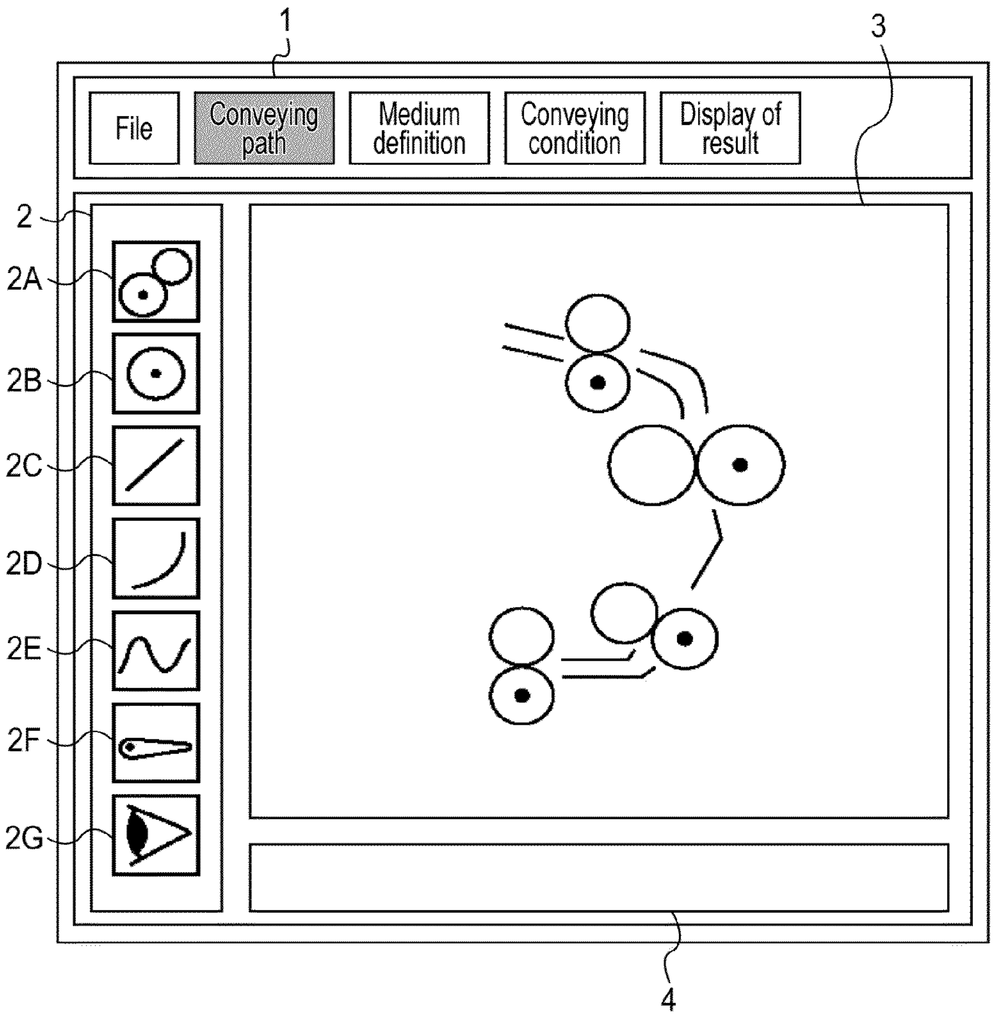
FIG. 3 shows an exemplary screen displayed on the basis of the design support program.
Figure 4:
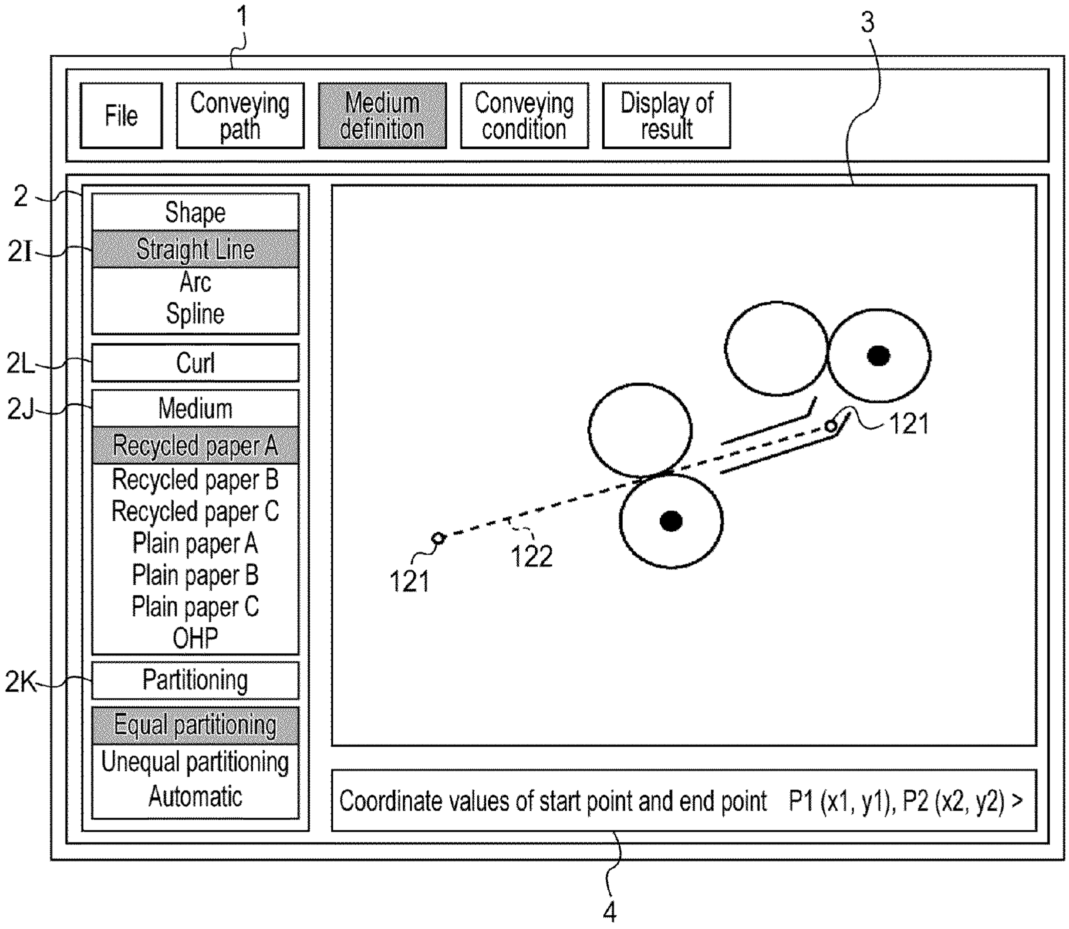
FIG. 4 shows another exemplary screen displayed on the basis of the design support program.
Figure 5:
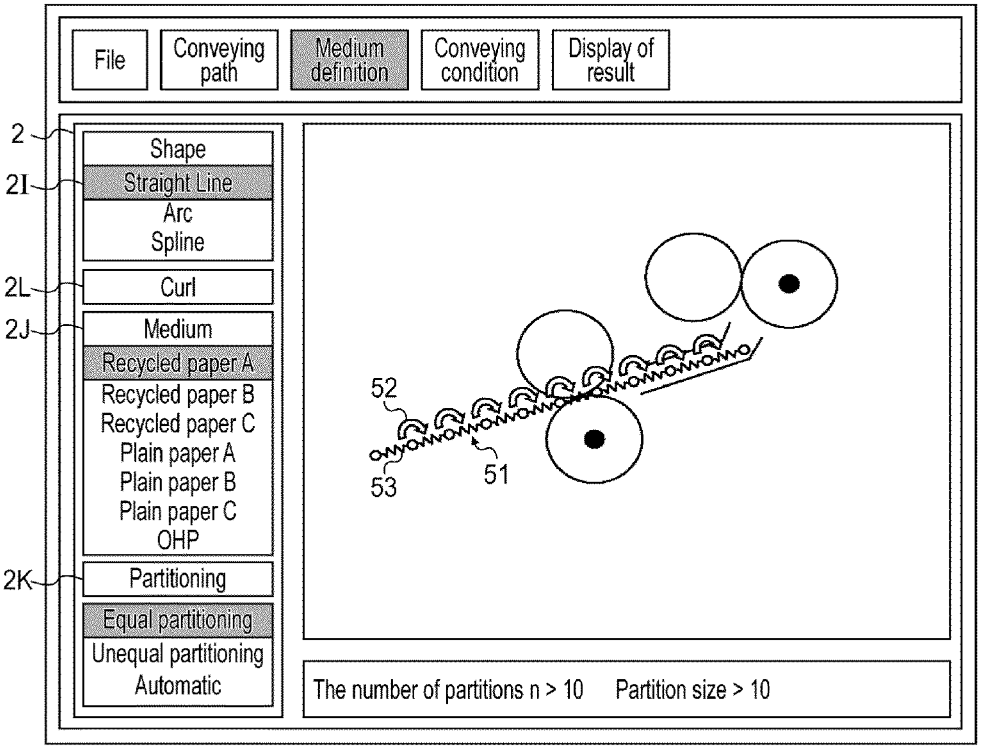
FIG. 5 shows another exemplary screen displayed on the basis of the design support program.

Examples of screens (user interfaces (UIs)) displayed in the display unit 12 will now be described. FIGS. 3 to 5 show exemplary screens displayed on the basis of the design support program. As shown in FIG. 3, the screen displayed on the basis of the design support program includes a menu bar 1 used for switching between items to be set and a sub-configuration menu 2 set for each item selected with the menu bar 1. The screen also includes a graphic field 3 and a command field 4. Information input with the sub-configuration menu 2, for example, a conveying path that is defined and the result of the conveying path are displayed in the graphic field 3. A program message is output in the command field 4 and, if needed, a numerical value is input in the command field 4. The menu bar 1 includes, for example, "File", "Conveying path", "Medium definition", "Conveying condition", and "Display of result" buttons.

When the "Conveying path" button is selected from the menu bar 1, a menu for defining a conveying path is displayed, for example, on the left side of the screen as the sub-configuration menu 2, as shown in FIG. 3. The sub-configuration menu 2 for defining a conveying path includes, for example, a pair-of-rollers definition button 2A used for defining a pair of rollers serving as a conveying roller, a roller definition button 2B used for defining a single roller, and a straight-line-guide definition button 2C used for defining a straight-line conveying guide. The sub-configuration menu 2 for defining a conveying path also includes an arc-guide definition button 2D used for defining an arc conveying guide, a spline-guide definition button 2E used for defining a spline-curve conveying guide, and a flapper definition button 2F used for defining a flapper (point) where the conveying path of the recording medium branches. The sub-configuration menu 2 for defining a conveying path further includes a sensor definition button 2G used for defining a sensor that detects whether the recording medium is at a predetermined position in the conveying path. The buttons from the pair-of-rollers definition button 2A to the sensor definition button 2G correspond to the parts composing the conveying path of an image forming apparatus, such as a copier or a printer. It is desirable that all the parts necessary to set the conveying path of the recording medium, such as a sheet of paper, be provided. Operating any of the buttons allows the corresponding part to be displayed in the graphic field 3.

When the "Medium definition" button is selected from the menu bar 1, a menu for defining a medium is displayed, for example, on the left side of the screen as the sub-configuration menu 2, as shown in FIG. 4. The sub-configuration menu 2 for defining a medium includes, for example, a drawing-shape selecting field 2I, a medium-type selecting field 2J, a partitioning-method selecting field 2K, and a curl setting button 2L.

The drawing-shape selecting field 2I includes, for example, “Straight line”, “Arc”, and “Spline” that are selectively displayed. When the “Straight line” is selected, a message prompting input of the coordinate values of both ends (start point and end point) of the recording medium is displayed in the command field 4. The user (designer) may input numerical values in the command field 4 as the coordinate values or may directly instruct the coordinate values in the graphic field 3 with a pointing device, such as a mouse. As in the conveying guide, the “Arc” or the “Spline” may be selected.

When the coordinate values of both ends of the recording medium are specified, a line segment (broken line) 122 connecting both ends 121 is drawn in the graphic field 3. The user can confirm how the recording medium is set in the conveying path by viewing the line segment 122.

The medium-type selecting field 2J includes one or more types of recording media that are selectively displayed. The types of the recording media may be registered in a database prior to the design. For example, it is preferred to register the types of the recording media that are generally used. In the registration of the types of the recording media in the database, parameters, such as the Young’s modulus, the density, and the thickness, that are used for calculation of the behavior of the recording medium are also registered for every type of the recording media. With the registration of the parameters, when any item is selected from the medium-type selecting field 2J, it is easily read out and use the parameters for the recording medium. It is assumed here that “Recycled paper A” is selected as the type of the recording medium and that the parameters “Young’s modulus: 5409 Mpa, Density: $6.8\times10^{-7}$ kg/mm$^3$, and Thickness: 0.0951 mm” are registered in the database in advance for the “Recycled paper A”. The type of the recording medium is associated with the rigidity of the recording medium in the database because the modulus of rigidity of the recording medium can be calculated from, for example, the Young’s modulus.

The partitioning-method selecting field 2K includes, for example, “Equal partitioning”, “Unequal partitioning”, and “Automatic” that are selectively displayed. When the shape is selected from the drawing-shape selecting field 2I and the coordinate values of both ends of the recording medium are input, a message in accordance with the “Equal partitioning”, the “Unequal partitioning”, or the “Automatic” that is selected is displayed in the command field 4. For example, when the “Equal partitioning” is selected, a message prompting input of the number of partitions or the partition size in digitization of the recording medium into multiple spring-mass systems is displayed in the command field 4. If the number of partitions (for example, a numerical value “10”) is input when the “Straight line” is selected as in the example in FIG. 4, the content of design of the conveying path reflecting the input values is displayed in the graphic field 3, as shown in FIG. 5. Referring to FIG. 5, a rotational spring 52 connecting material points 51 represents the flexural rigidity when the recording medium is regarded as an elastic body and a translational spring 53 represents the tensile rigidity. Both of the spring constants can be derived from the theory of elasticity.

The curl setting button 2L can be used to form a curl shape having a curvature as the initial shape of the recording medium. For example, in order to form a shape in which the recording medium is entirely curled, a radius of curvature can be specified to define the curl. The radius of curvature is specified, for example, by inputting a numerical value in the command field 4.

The “Conveying condition” button in the menu bar 1 is used to set the rotational velocity of each conveying roller of the recording medium. The user presses the “Conveying condition” button to sequentially specify the values of the rotational velocities of the rollers in the command field 4.

The conveying path of the image forming apparatus is designed in the above manner. According to the present exemplary embodiment, any configuration may be set in the design of the conveying path as long as predetermined parameters are registered for each type of the recording medium and the parameters are available in accordance with the selection of the type of the recording medium.

Figure 6:
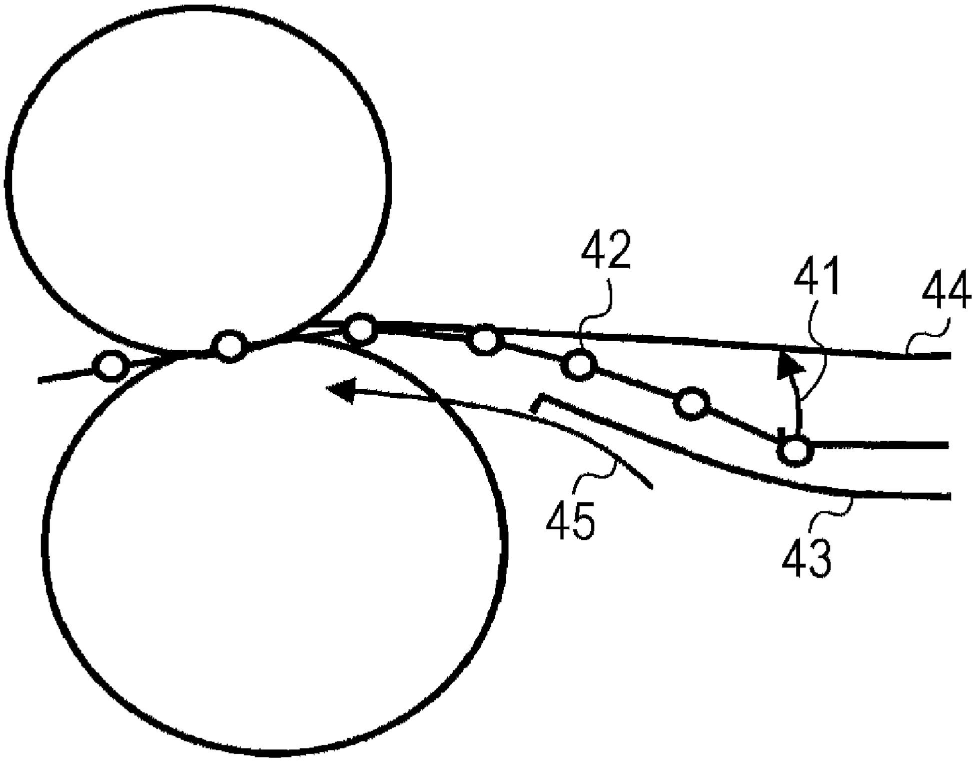
FIG. 6 illustrates the behavior of a recording medium in a conveying path.

It is important to analyze the behavior of the recording medium, which instantaneously occurs when the recording medium is being conveyed, in detail in the analysis of the conveying path of the recording medium. For example, it is important to analyze the behavior of the recording medium when the trailing end of the recording medium is released from a state in which the trailing end thereof is kept in contact with the conveying path. Specifically, as shown in FIG. 6, when a recording medium 42 that is bent is fed in the conveying path in a direction 45 and the trailing end of the recording medium 42 runs through a guide 43, the running velocity of the recording medium 42 instantaneously increases from the previous stationary velocity due to the restoring force of the recording medium 42. Then, the trailing edge of the recording medium 42 follows a locus 41 to be in contact with a guide 44. It is important to analyze this behavior because a strong impact can be instantaneously applied to the recording medium 42 to adversely affect an image in the image forming apparatus, such as a copier.

Accordingly, in order to analyze the phenomena before and after the contact with the guide 44 in detail, the time integration of physical quantities may be used to output the waveforms of, for example, a variation in velocity and the contact reaction force with the guide.

However, increasing the frequency of the writing of the calculation result in a file in the time integration, that is, frequent file output makes the file too large. In contrast, decreasing the frequency of the writing thereof makes the detailed analysis difficult.

Figure 7:
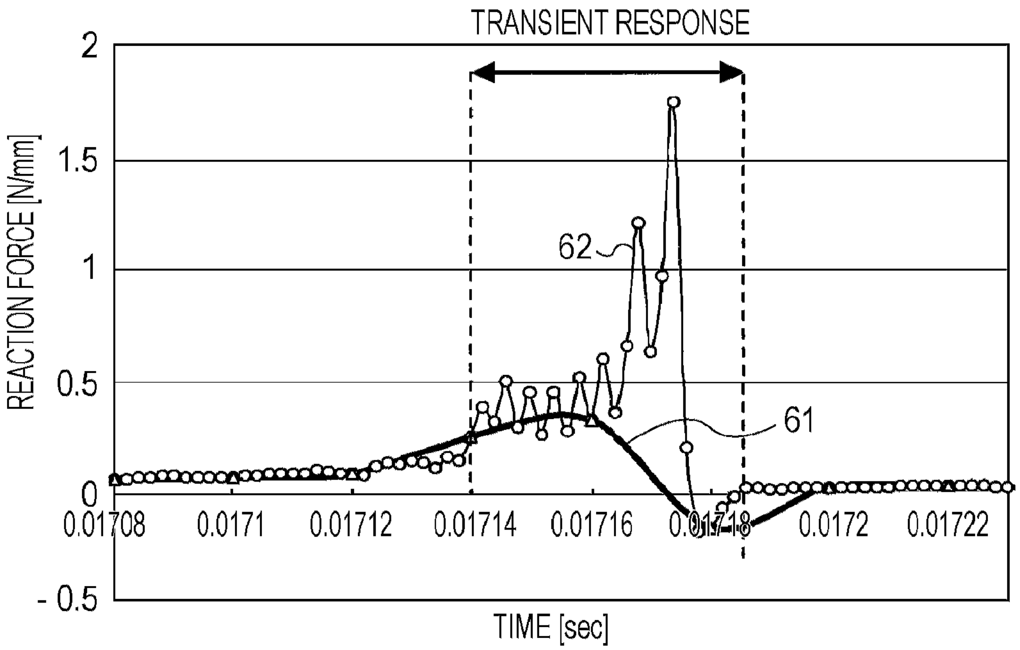
FIG. 7 includes graphs showing the relationship between the frequency of file output and the resulting waveform.

FIG. 7 includes exemplary graphs showing the relationship between the frequency of file output and the resulting waveform. For example, it is possible to keep track of the detailed variation in the contact reaction force at peaks when a time step $\Delta t$ of the time integration is set to “$2.0\times10^{-7}$ [s]” and the file output is performed for every ten cycles in the analysis of the contact reaction force, as shown by a graph 62 in FIG. 7. However, the load of the subsequent readout of the file and the subsequent output of the waveform is increased because the file has a considerable size. In contrast, when the file output is performed for every 100 cycles, it becomes difficult to keep track of the contact reaction force in detail although the load is reduced, as shown by a graph 61 in FIG. 7. Accordingly, it is difficult to resolve the problem, that is, to balance the trade-off between the detailed analysis and the reduction of the load only by performing the file output at equal intervals.

Figure 8:
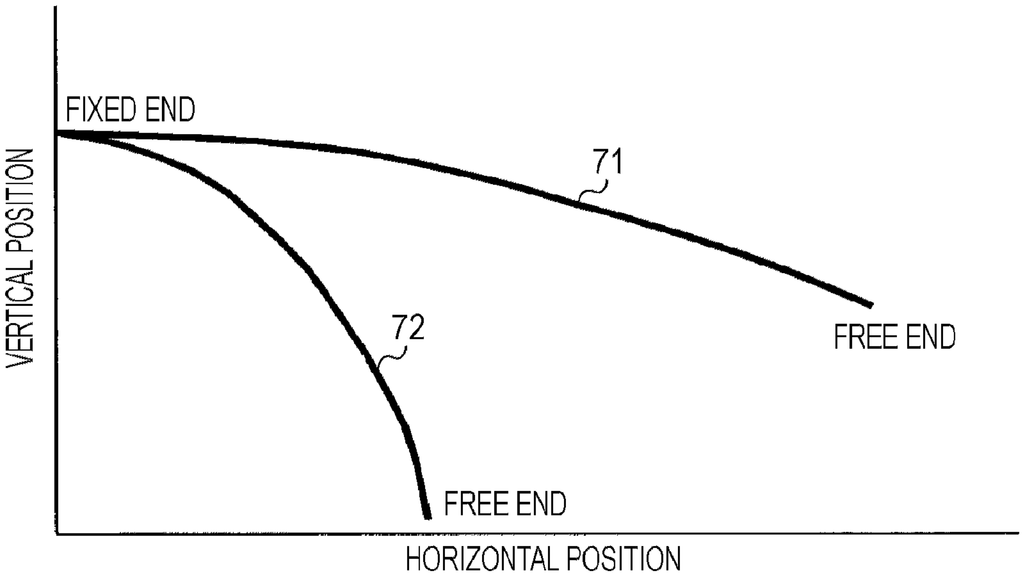
FIG. 8 illustrates how the shapes of two types of recording media having different rigidities are varied.

A main factor for determination of the behavior of a recording medium in the analysis of the conveying path of the recording medium is the rigidity of the recording medium. For example, a test shown in FIG. 8 in which one end of a recording medium 71 having a higher rigidity and one end of a recording medium 72 having a lower rigidity are fixed and the recording medium 71 and the recording medium 72 are bend by their weights shows that the amount of variation in the position of the free end of the recording medium 71 greatly differs from the amount of variation in the position of the free end of the recording medium 72. Accordingly, it is important to quantitatively evaluate the difference in the behavior caused by the difference in the rigidity in the analysis of the conveying path of the recording medium. The modulus of rigidity resulting from digitalization of the rigidity is a physical quantity derived from the Poisson's ratio and the Young' modulus of the recording medium and is varied depending on the type of the recording medium. Since the Poisson's ratio is a numerical value concerning the shape of the recording medium, the Poisson's ratio can be derived from the thickness of the recording medium. Accordingly, according to the present exemplary embodiment, the Young's modulus and the thickness are included in the parameters of each type of the recording medium, as described above.

A method of analyzing the conveying path of an image forming apparatus using the design support apparatus having the above configuration will now be described.

Figure 9:
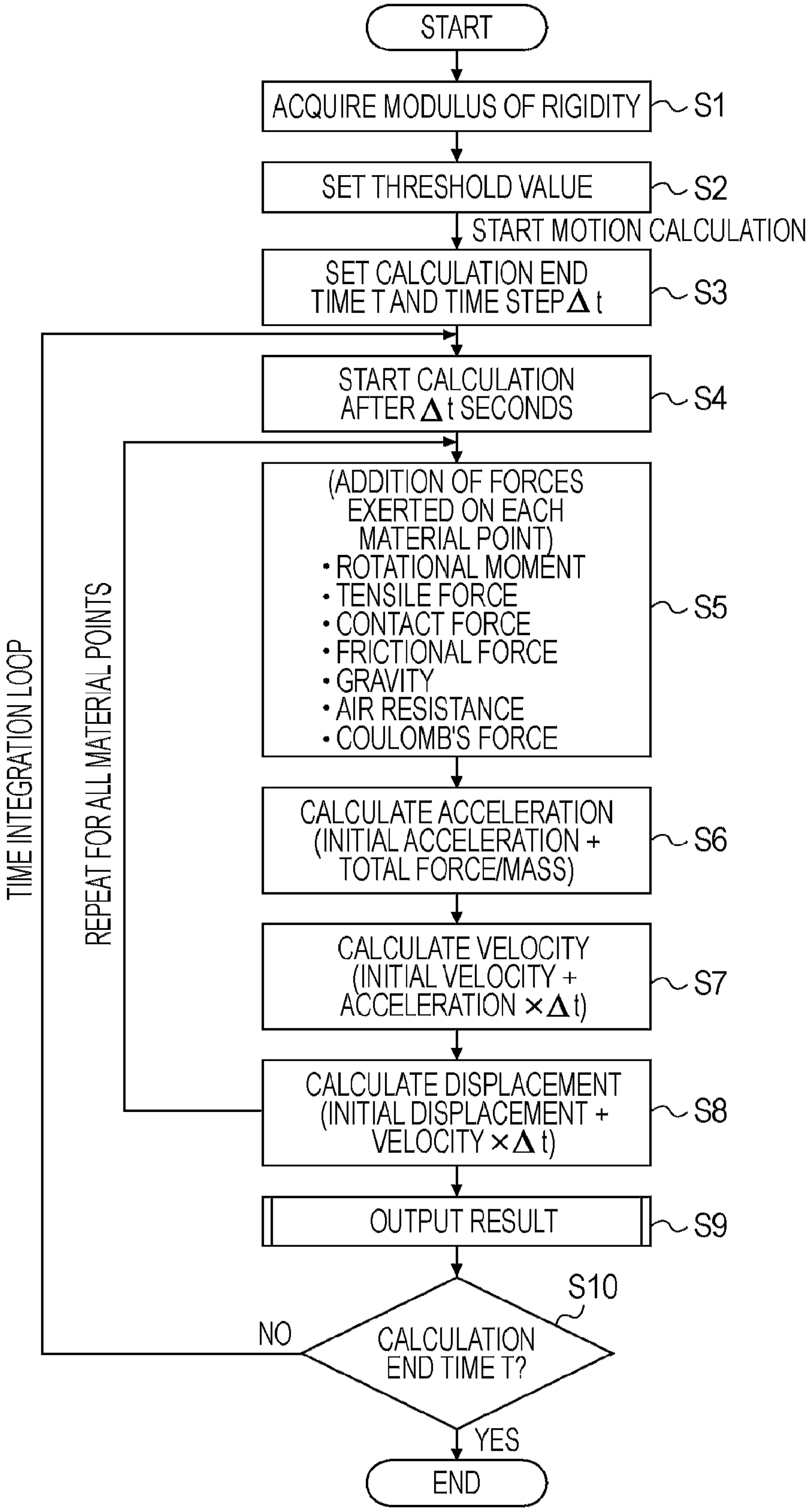
FIG. 9 is a flowchart showing an example of a method of analyzing a conveying path according to the exemplary embodiment of the present invention.

It is assumed that the user (designer) has designed a conveying path by using, for example, the screens shown in FIGS. 3 to 5 and the configuration of the conveying path, the type of the recording medium that is used, and the parameters of the recording medium have been set in the design. When the "Display of result" button is pressed in the above state, the designed conveying path is analyzed to display the analysis result. FIG. 9 is a flowchart showing an example of a method of analyzing a conveying path according to the embodiment of the present invention.

Referring to FIG. 9, in Step S1, the CPU 11 reads out the Young' modulus, the density, the thickness, etc. of the recording medium from the database in accordance with the type of the recording medium, included in the design data about the conveying path, to acquire the modulus of rigidity of the recording medium from the readout values.

In Step S2, the CPU 11 sets a threshold value on which the determination of whether the calculation result is output in a file is based in accordance with the acquired modulus of rigidity. Since the modulus of rigidity is specific to each recording medium type, the threshold value may be considered to be specific to each recording medium type.

In Step S3, the CPU 11 starts the calculation of the motion and sets a real time (a calculation end time) T during which the motion of the recording medium is calculated and a time step Δt (sec) of the numerical time integration used for numerically seeking the solution of the equation of motion. The subsequent steps from Step S4 to Step S10 form a loop in which the motion of the recording medium is calculated for every time step Δt from the initial time and the results of the calculation are stored in the RAM 15.

In Step S4, the CPU 11 sets an initial acceleration, an initial velocity, and an initial displacement necessary for the calculation after the Δt seconds. Each time one cycle is completed, the results of the calculation are updated (that is, the calculation values of the previous cycle are used as the initial values).

In Step S5, the CPU 11 defines the forces exerted on each material point composing the recording medium. The rotational moment, the restoring force represented by the tensile force, the contact force, the frictional force, the gravity, the air resistance, and the Coulomb's force are used in the calculation here. The CPU 11 calculates the forces exerted on each material point and, then, the resultant force (the total force) is defined as the force that is finally exerted on the recording medium.

In Step S6, the CPU 11 divides the total force exerted on each material point calculated in Step S5 by the mass of the material point and adds the initial acceleration to the result of the division to calculate the acceleration of the material point after Δt seconds.

In Step S7, the CPU 11 multiplies the acceleration calculated in Step S6 by Δt and adds the initial velocity to the result of the multiplication to calculate the velocity of the material point after Δt seconds.

In Step S8, the CPU 11 multiples the velocity calculated in Step S7 by Δt and adds the initial displacement to the result of the multiplication to calculate the displacement of the material point after Δt seconds.

The CPU 11 repeats the calculations from Step S5 to Step S8 to calculate the displacements of all the material points after Δt seconds. Although the Euler's time integration method is adopted in the series of calculations of the physical quantities after Δt seconds in Steps S5 to S8 in the present exemplary embodiment, another time integration method, such as the Kutta-Merson method, the Newmark's β method, or the Wilson's θ method, may be adopted.

Figure 10:
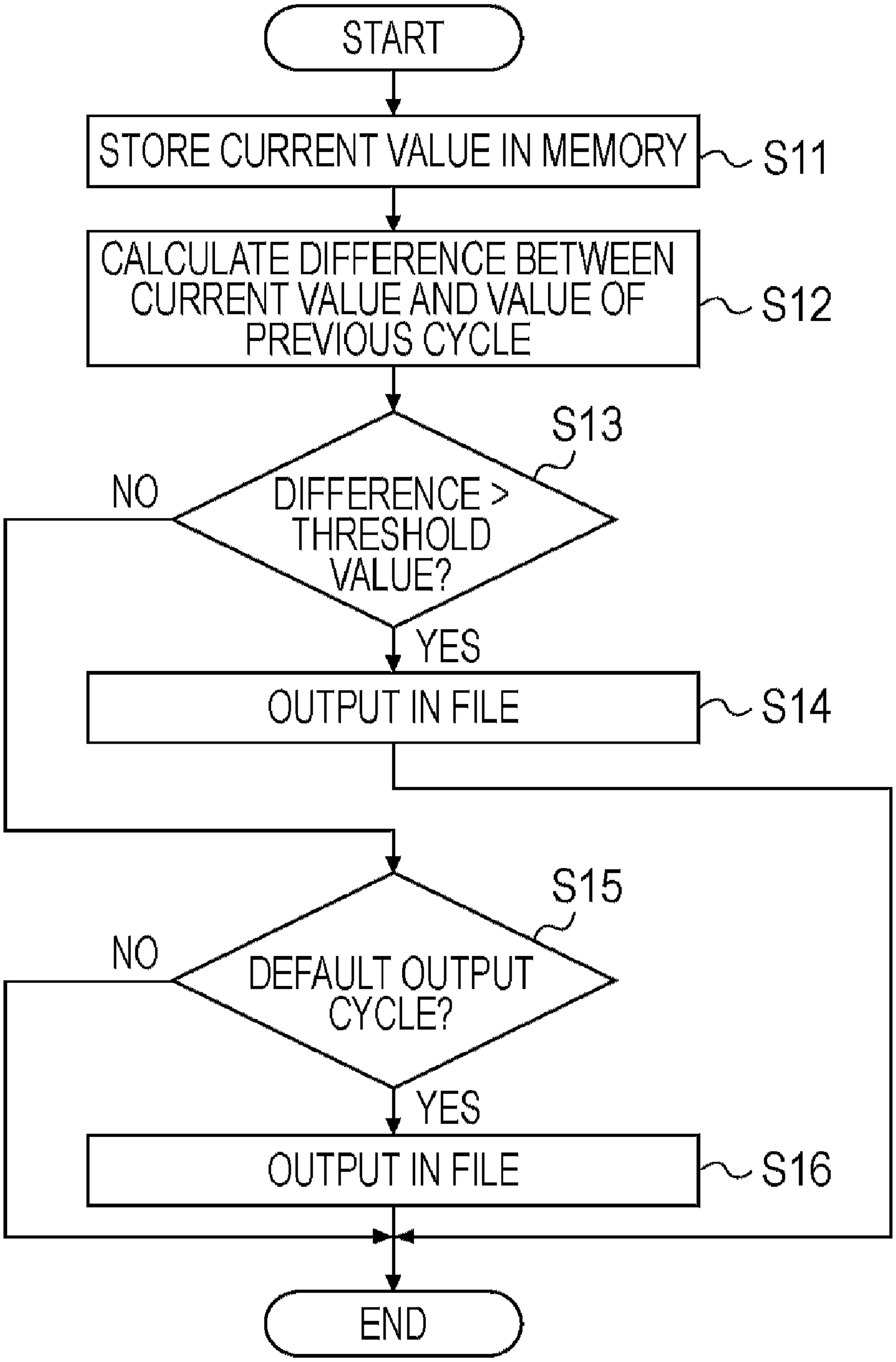
FIG. 10 is a flowchart showing a process of outputting a result in FIG. 9 in detail.

In Step S9, the CPU 11 outputs the result of the calculations. Step 9 will now be described in detail here. FIG. 10 is a flowchart showing the process in Step S9 in FIG. 9 in detail.

Referring to FIG. 10, in Step S11, the CPU 11 stores the displacement of each material point in the RAM 15.

In Step S12, the CPU 11 reads out the displacement of each material point stored in the RAM 15 in the previous cycle (the cycle before Δt seconds) to calculate the difference between the current displacement and the readout displacement.

In Step S13, the CPU 11 determines whether the difference calculated in Step S12 is larger than the threshold value set in Step S2.

If the CPU 11 determines that the difference is larger than the threshold value (YES in Step S13), then in Step S14, the CPU 11 outputs the current displacement in the file. In other words, the current displacement is included in the file.

If the CPU 11 determines that the difference is not larger than the threshold value (NO in Step S13), then in Step S15, the CPU 11 determines whether the current cycle corresponds to the default output cycle. Specifically, if the file output for every 1,000 cycles is set by default regardless of the difference from the threshold value, the CPU 11 determines whether the current cycle corresponds to the 1,000-th cycle. The default output cycle may not be fixed and may be a variable cycle on which the file output is regularly performed.

If the CPU 11 determines that the current cycle corresponds to the default output cycle (YES in Step S15), then in Step S16, the CPU 11 outputs the current displacement in the file.

If the CPU 11 determines that the current cycle does not correspond to the default output cycle (NO in Step S15), the process in FIG. 10 is terminated without performing the file output.

Step S9 is performed in the above manner. The velocity and/or acceleration of each material point may also be targeted for the file output. In this case, the storage, the calculation, and the determination are performed to the velocity and/or acceleration in Steps S11, S12, S13, and S15.

Referring back to FIG. 9, after Step S9, then in Step S10, the CPU 11 determines whether the real time T set in Step S3 has arrived.

If the CPU 11 determines that the real time T has arrived (YES in Step S10), the analysis of the conveying path is terminated. If the CPU 11 determines that the real time T has not arrived (NO in Step S10), Steps S4 to S9 are repeated.

Figure 11:
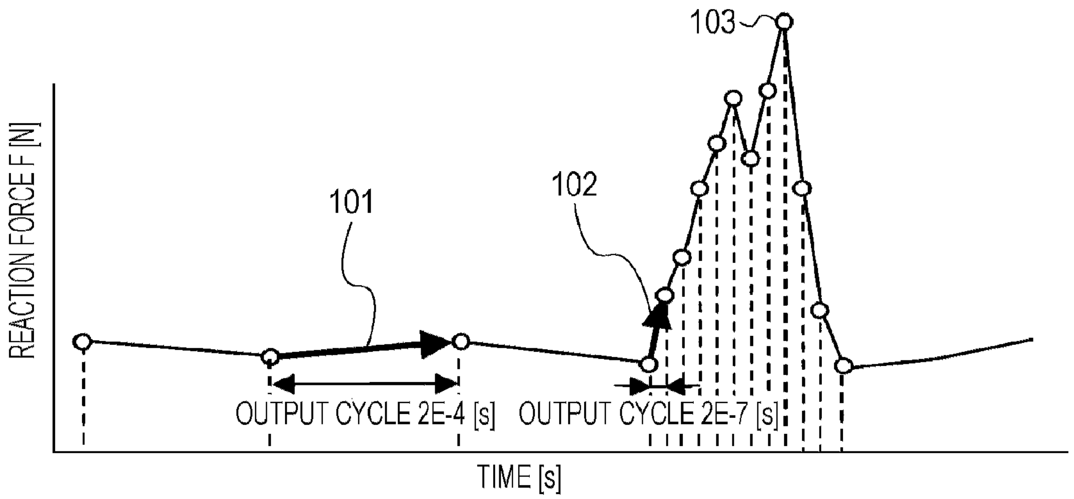
FIG. 11 is a graph showing an exemplary waveform resulting from analysis.

Such an analysis described above shows, for example, a waveform shown in FIG. 11. Referring to FIG. 11, in the time zone in which the variation in the physical quantity, such as the initial displacement, for every Δt second is small, that is, in the time zone in which the detailed analysis is not required, a graph segment 101 based on the file output for every 1,000 cycles (for every $2\times10^{-4}$ [s]) is drawn by default (Step S16). Then, when the variation in the physical quantity for every Δt second is increased, as shown by an arrow 102, and the amount of variation exceeds the threshold value, the frequency of the file output is increased. Specifically, in the time zone in which the variation in the physical quantity for every Δt second is large, that is, in the time zone in which the detailed analysis is required, a graph segment 103 based on the file output for every cycle (for every $2\times10^{-7}$ [s]) is drawn (Step S14).

The threshold value on which the determination of whether the file output is performed is based should be increased with the increasing modulus of rigidity of the recording medium. This is because setting a higher threshold value for the recording medium having a lower modulus of rigidity makes detection of peaks difficult while setting a lower threshold value for the recording medium having a higher modulus of rigidity causes unnecessary parts other than the peaks to be output to make the file size too large.

Figure 12:
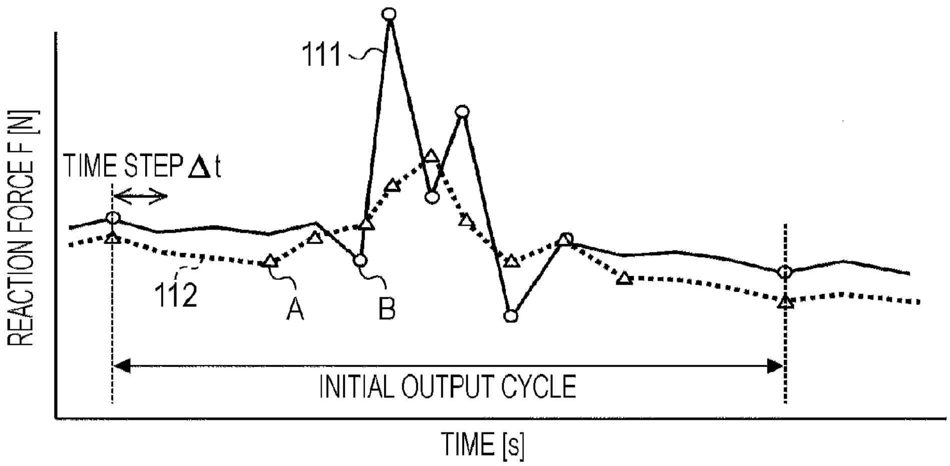
FIG. 12 is a graph showing the relationship between the rigidity and a threshold value.

In contrast, setting a lower threshold value for the recording medium having a lower modulus of rigidity and setting a higher threshold value for the recording medium having a higher modulus of rigidity produce appropriate waveforms, as shown in FIG. 12, without excessively increasing the file size. Referring to FIG. 12, a graph 111 is for the recording medium having a higher modulus of rigidity, in which a higher threshold value is set. A graph 112 is for the recording medium having a lower modulus of rigidity, in which a lower threshold value is set. The initial output cycle in FIG. 12 is a cycle of the file output (Step S16) based on default settings. In the graph 111, the difference exceeds the threshold value at a time B (Step S13) and the detailed file output (Step S14) for every cycle is performed after the time B. In the graph 112, the difference exceeds the threshold value at a time A (Step S13) and the detailed file output (Step S14) for every cycle is performed after the time A. As described above, the adjustment of the threshold value in accordance with the modulus of rigidity allows the characteristics of the waveform of the reaction force caused by the collision of the recording medium to be appropriately acquired and prevents the file size from being excessively increased.

Figure 13:
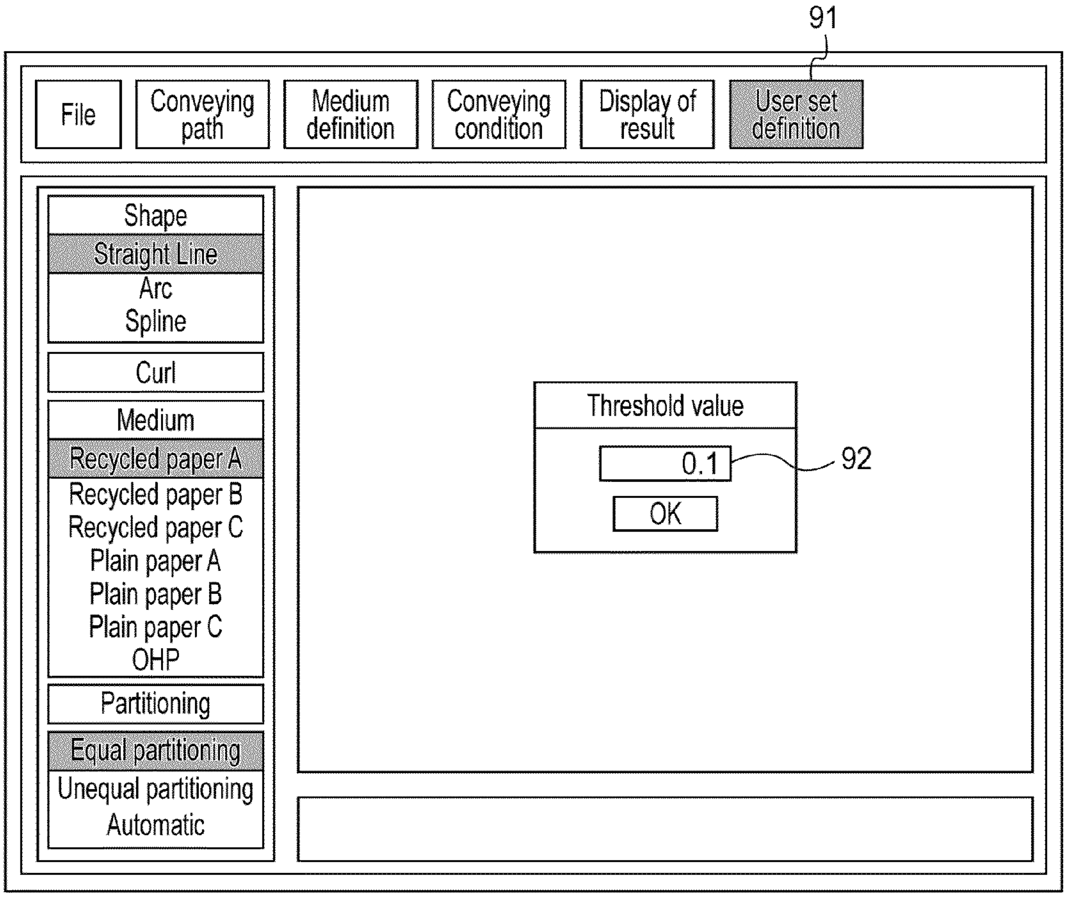
FIG. 13 shows an exemplary screen that is displayed according to a modification of the exemplary embodiment of the present invention.

Although the CPU 11 sets the threshold value in accordance with the modulus of rigidity in Step S2 in the above exemplary embodiment, the user may set the threshold values. For example, as shown in FIG. 13, a "User set definition" button 91 may be additionally provided on the screen shown in FIG. 3 and a user interface including a field 92 in which the user inputs an arbitrary value may be displayed when the button 91 is pressed. When "OK" button is pressed after the arbitrary value is input, the processing in Step S3 and the subsequent steps may be performed.

According to the above exemplary embodiments, since the threshold value is set in accordance with the type of the recording medium and the frequency of the file output is adjusted in accordance with the result of the comparison between the threshold value and the variation in the physical quantity, it is possible to provide the detailed calculation results while suppressing the excessive file output. Accordingly, it is possible to inhibit the file size from being excessively increased in the file output.

Although the time step Δt in the time integration is fixed and the cycle of the file output is determined from the difference between the variation in the physical quantity and the threshold value in the above exemplary embodiments, the time step Δt may be varied on the basis of the difference between the variation in the physical quantity and the threshold value. For example, the file output may be performed on every cycle and the time step Δt may be decreased after the cycle on which it is determined that the variation in the physical quantity exceeds the threshold value.

Such an analysis method also allows an appropriate waveform to be acquired while inhibiting the file size from being excessively increased. In addition, it is possible to reduce the number of calculations.

Figure 14:
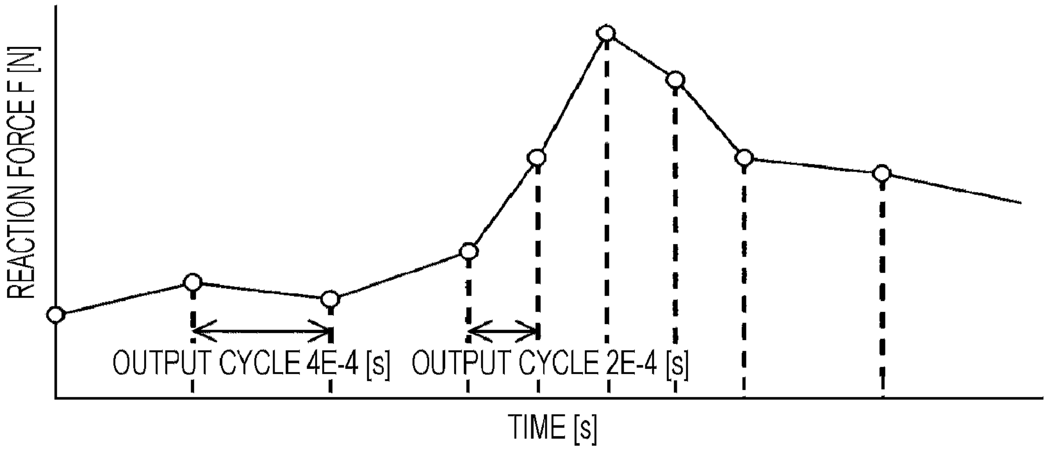
FIG. 14 is a graph showing an exemplary waveform according to another modification of the exemplary embodiment of the present invention.

FIG. 14 is a graph showing an example of a waveform resulting from the above analysis. In the example in FIG. 14, one cycle is set to $4\times10^{-4}$ [s] before the difference exceeds the threshold value and one cycle is set to the half value, that is, $2\times10^{-4}$ [s] after the difference exceeds the threshold value. With this method, the time step Δt is decreased only in the time zone in which the detailed analysis is required and the calculation is performed at the double speed in the remaining time zone.

The exemplary embodiments of the present invention may be realized by a computer that executes a program. In addition, a unit for supplying the program to the computer, for example, a computer-readable storage medium (recording medium), such as a compact disk-read only memory (CD-ROM), on which the program is recorded or a transmission medium, such as the Internet, over which the program is transmitted is applicable to the exemplary embodiments of the present invention. Furthermore, the program is also applicable to the exemplary embodiments of the present invention. The present invention is embodied by the program, the recording medium, the transmission medium, and the program product.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-100754 filed Apr. 8, 2008, which is hereby incorporated by reference herein in its entirety.

What is claimed is:

1. An analysis apparatus comprising:

a threshold-value setting unit configured to set a type of a recording medium to be analyzed and a threshold value;

a calculating unit configured to calculate a physical quantity concerning the recording medium when the recording medium is being conveyed in a conveying path that is designed and to store the calculated physical quantity in a storage unit, wherein the physical quantity is a reaction force exerted on the recording medium; and an output unit configured to output the physical quantity on a cycle longer than that in a case where an amount of variation in the physical quantity calculated by the calculating unit exceeds the threshold value, if the amount of variation in the physical quantity is less than the threshold value.

2. The analysis apparatus according to claim 1, wherein the physical quantity includes an acceleration and a velocity of the recording medium.

3. The analysis apparatus according to claim 1, wherein the threshold-value setting unit reads out the threshold value from a database in which each type of the recording medium is associated with a rigidity and sets the readout threshold value.

4. The analysis apparatus according to claim 1, wherein the threshold-value setting unit sets a value input through an interface as the threshold value.

5. An analysis method performed by an analyzing apparatus including at least one processor and memory communicatively-coupled via a bus, comprising:

setting a type of a recording medium to be analyzed and a threshold value;

calculating a physical quantity concerning the recording medium when the recording medium is being conveyed in a conveying path that is designed and storing the calculated physical quantity in a storage unit, wherein the physical quantity is a reaction force exerted on the recording medium; and outputting the physical quantity on a cycle longer than that in a case where an amount of variation in the calculated physical quantity exceeds the threshold value, if the amount of variation in the physical quantity is less than the threshold value.

6. A computer-readable storage medium storing a computer-executable process, the computer-executable process causing a computer to execute a method comprising:

setting a type of a recording medium to be analyzed and a threshold value;

calculating a physical quantity concerning the recording medium when the recording medium is being conveyed in a conveying path that is designed and storing the calculated physical quantity in a storage unit, wherein the physical quantity is a reaction force exerted on the recording medium; and outputting the physical quantity on a cycle longer than that in a case where an amount of variation in the calculated physical quantity exceeds the threshold value, if the amount of variation in the physical quantity is less than the threshold value.

* * * * *